United States Patent [19]

Giulie et al.

[11] 4,444,465
[45] Apr. 24, 1984

[54] CRT SHIELD

[76] Inventors: Joe D. Giulie; Jean W. Giulie, both of 1015 Corporation Way, Palo Alto, Calif. 94303

[21] Appl. No.: 333,818

[22] Filed: Dec. 23, 1981

[51] Int. Cl.³ ............................................. G02B 27/00
[52] U.S. Cl. .................................. 350/276 R; 358/252
[58] Field of Search ...................... 350/276 R; 358/252

[56] References Cited

U.S. PATENT DOCUMENTS 2,482,031  9/1949  Rose ................................ 350/276 R

FOREIGN PATENT DOCUMENTS 1022727  3/1966  United Kingdom ................ 358/252

Primary Examiner—John K. Corbin
Assistant Examiner—Rebecca D. Gass
Attorney, Agent, or Firm—Robert G. Slick

[57] ABSTRACT

An adjustable shield is provided which fits over the cabinet of a CRT to help eliminate glare on the screen and also serves as a security shield. The shield is made in three telescoping pieces so that a standard shield can be adjusted to fit a number of different sizes.

4 Claims, 3 Drawing Figures

CRT SHIELD

SUMMARY OF THE INVENTION

CRT readouts are very common in many applications such as word processors, T.V., computers, oscilloscopes, monitors or the like. Such CRTs are ordinarily enclosed in a cabinet so that the face of the tube is not protected from ambient light as from overhead light fixtures or windows at the side. This glare is highly undesirable and is tiring on the operator. The present invention provides a shield which extends along the top and sides of the CRT. This serves to not only reduce glare but also serves as security shield since in many applications confidential code numbers may appear on the screen and it is not desired that bystanders be able to read the numbers.

The shield of the present invention is made in three telescoping sections so that it will fit a wide variety of CRT applications. Thus, the device of the present invention can be used with the smallest to the largest cabinets.

Since the CRT shield of the present invention is made of three separate pieces, it can be stored and shipped in a minimum of space.

Other features and advantages of the invention will appear in the balance of the specification.

DESCRIPTION OF THE PREFERRED EMBODIMENTS

Figure 1:
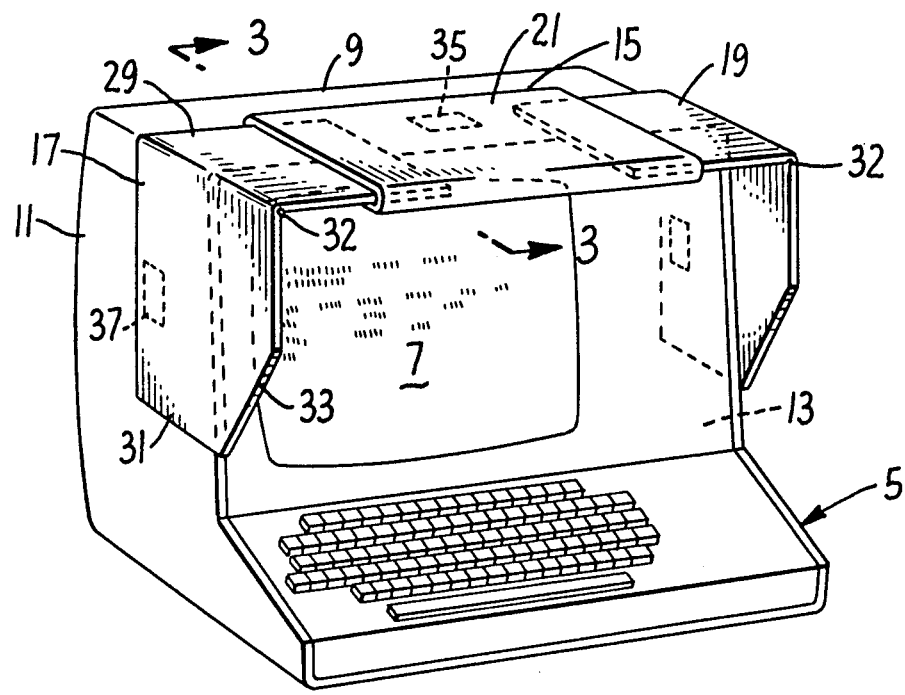
FIG. 1 is a perspective view of a CRT terminal showing a shield embodying the present invention in place.
Figure 2:
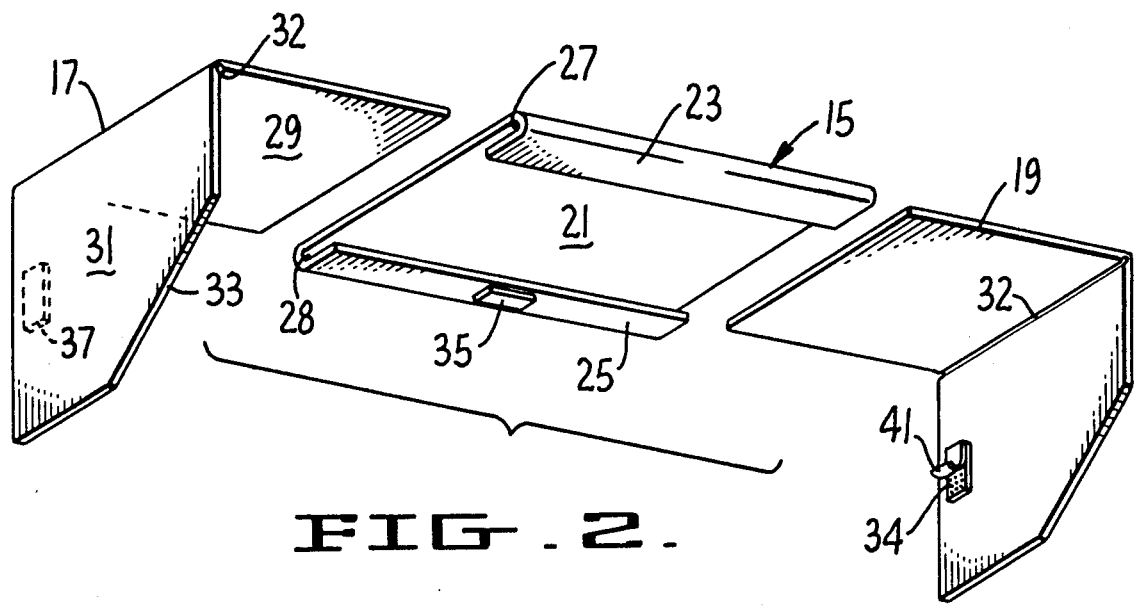
FIG. 2 is a perspective, exploded view of the shield of the present invention.
Figure 3:
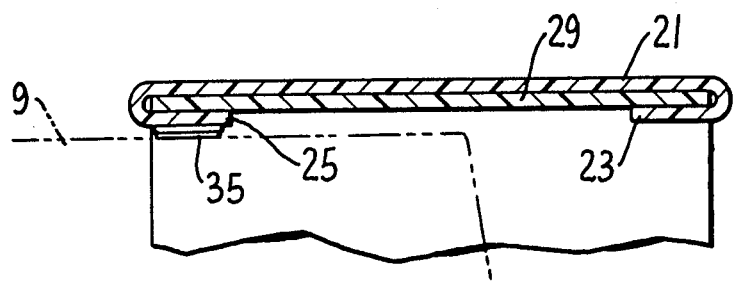
FIG. 3 is a section on the line 3—3 of FIG. 1.

Referring now to the drawings by reference characters, there is shown a terminal generally designated 5. The terminal has a CRT 7 and is housed in a cabinet having a top 9 and ends 11 and 13. The shield proper is made in three pieces, namely, a center section 15, an end section 17 and a second end section 19. The center section 15 has a center flat portion 21 and in general this section should be slightly less in width than the smallest cabinet on which the shield is to be used. The front and rear edges are rolled over as at 23 and 25 so that the section of the edge forms a U with gaps 27 and 28 formed between the bottom of the flat central section and the turned over edges. The end 17 has a horizontal portion 29 and a downwardly extending end portion 31, preferably joined by a hinge, such as a living hinge 32. The hinge facilitates installation on a cabinet having sloping sides and also allows the end to be folded flat for shipping and storage. The lower front edge portion 33 is preferably cut off at an angle. The opposite end portion 19 is a mirror image and therefore not described in detail. The thickness of the horizontal portion 29 is such that it just forms a snug fit in gaps 27 and 28 at the front and back of the shield. The shield is telescoped together and placed over the cabinet and pushed in so that the vertical portions of the ends are flush with the two sides of the cabinet. The front edge of the thus assembled structure is normally pulled forward so it will extend outwardly over the face of the CRT, protecting it from ambient light as well as giving a certain measure of security.

It is ordinarily not necessary to fasten the parts together or to fasten them to the cabinet of the CRT. However, if it is desired to provide fasteners, this can take the form of the pressure sensitive tapes 34, 35 and 37. Preferably this is of the dual locking peel and press type which allows for easy placement and removal for servicing.

Preferably the shield of the present invention is made of a tough inert plastic which can be opaque, preferably either in black or dark green or it might be made of a smoky gray transparent plastic.

Various variations can be made from the exact structure shown without departing from the spirit of this invention.

We claim:

1. An adjustable shield for a CRT in an enclosure, comprising in combination:
   a. a center portion of generally rectangular configuration having a flat surface with two ends and a front and a back,
   b. the end-to-end length of the central portion being no longer than the width of the smallest enclosure on which the shield is to be used,
   c. the front and back edges of the center portion being rolled under to provide U-shaped edges with a gap between the terminal ends and the underside of the flat surface,
   d. two L-shaped end portions which are mirror images, each having a horizontal portion adapted to fit into the gaps formed at the front and back of the central portion, and each having a down turned end whereby:
   e. said center portion can be placed on the top of the enclosure with the front edge of the center and end portions extending forward of said enclosure and the two end portions telescoped therein to provide a shield over the front and sides of the CRT.

2. The shield of claim 1 wherein the lower front edges of the end portions are cut back at an angle.

3. The shield of claim 1 wherein each of the three portions making up the shield has a small spot of a pressure sensitive adhesive thereon to hold the shield in place on a cabinet.

4. The shield of claim 1 wherein the horizontal portion and the downturned end of each of the L-shaped portions are joined by a hinge.

* * * * *